United States Patent [19]

Petrov et al.

[11] Patent Number: 4,908,814
[45] Date of Patent: Mar. 13, 1990

[54] METHOD OF PHOTOTHERMAL INFORMATION RECORDING READING AND ERASING

[75] Inventors: Vyacheslav V. Petrov; Dmitry A. Grinko; Alexandr A. Antonov; Andrei A. Krjuchin, all of Kiev, U.S.S.R.

[73] Assignee: Institut Problem Modelirovanija v Energetiki AN Ukr. SSR, Kiev, U.S.S.R.

[21] Appl. No.: 135,029

[22] PCT Filed: Feb. 5, 1987

[86] PCT No.: PCT/SU87/00016

§ 371 Date: Oct. 6, 1987

§ 102(e) Date: Oct. 6, 1987

[87] PCT Pub. No.: WO87/04839

PCT Pub. Date: Aug. 13, 1987

[30] Foreign Application Priority Data

Feb. 7, 1986 [SU] U.S.S.R. .............. 3134136

[51] Int. Cl.⁴ .............. G11B 7/00; G01D 15/10; H04N 1/23
[52] U.S. Cl. .............. 369/100; 369/126; 369/153; 346/153.1; 346/76 L; 358/300
[58] Field of Search .............. 369/100, 110, 111, 112, 369/123, 124, 126, 153, 154; 346/150, 151, 153.1, 74.2, 74.4, 76 R, 76 PH, 76 L, 103; 358/300, 301, 302

[56] References Cited

U.S. PATENT DOCUMENTS

| | | | |
|---|---|---|---|
| 3,168,726 | 2/1965 | Boblett | 369/126 X |
| 3,427,628 | 2/1969 | Clunis | 269/126 X |
| 4,041,532 | 8/1977 | Plows et al. | 369/126 |
| 4,304,848 | 12/1981 | Bouldin et al. | 369/153 |
| 4,330,883 | 5/1982 | Ohta et al. | 369/100 |
| 4,340,953 | 7/1982 | Iwamura et al. | 369/126 |
| 4,371,954 | 2/1983 | Cornet | 369/100 X |
| 4,398,203 | 8/1983 | Cornet | 369/100 X |
| 4,403,318 | 9/1983 | Nagashima et al. | 369/100 |
| 4,404,656 | 9/1983 | Cornet | 369/100 X |
| 4,489,278 | 12/1984 | Sawazaki | 369/126 |
| 4,527,173 | 7/1985 | Gupta et al. | 369/100 X |
| 4,596,993 | 6/1986 | Erlichman | 346/76 L X |
| 4,599,718 | 7/1986 | Nakagawa et al. | 369/100 |
| 4,647,947 | 3/1987 | Takeoka | 346/76 L X |
| 4,659,620 | 4/1987 | Benhamou | 346/76 L X |
| 4,710,911 | 12/1987 | Yamada et al. | 369/100 |
| 4,719,615 | 1/1988 | Feyrer et al. | 369/100 X |

FOREIGN PATENT DOCUMENTS

| | | | |
|---|---|---|---|
| 0046104 | 2/1982 | European Pat. Off. | 346/76 L X |
| 55-154196 | 12/1980 | Japan | 346/76 L X |
| 2121227 | 12/1983 | United Kingdom | 369/100 X |

OTHER PUBLICATIONS

A. L. Kartuzhansky, Neserebrianye Protsessy Tonkikh Plenok Zhidkos ti; 1984, Khimiya Publ., Leningrad, pp. 231–232.

A. L. Kartuzhansky, Neserebrianye Fotograficheskie Protsessy, 1984, Khimiya Publ., Leneingrad, pp. 44–49.

Problemy razvitiya Radiotekhniki, 1985, Tsentralnoye i gruzinskoye respublikanskoe . . . Popova, Moscow, pp. 62–63.

Primary Examiner—William L. Sikes
Assistant Examiner—Brain M. Healy
Attorney, Agent, or Firm—Lilling & Greenspan

[57] ABSTRACT

A method for photothermal information recording, reading and erasing consists in that the surface of a recording medium (1) is charged prior to the photothermal recording process and then exposed, during photothermal information recording and erasing, to a modulated electromagnetic beam (8) localized to a spot size of the order of one information unit with the energy exceeding the energy required for softening the material of the recording medium (1), and, during information readout, with the energy less than that for softening the material of the recording medium (1), the surface of the recording medium (1) being discharged before erasing information.

1 Claim, 2 Drawing Sheets

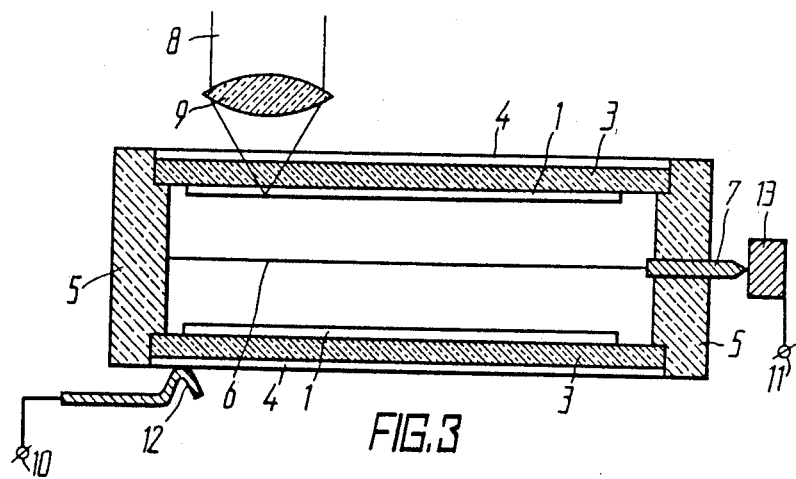
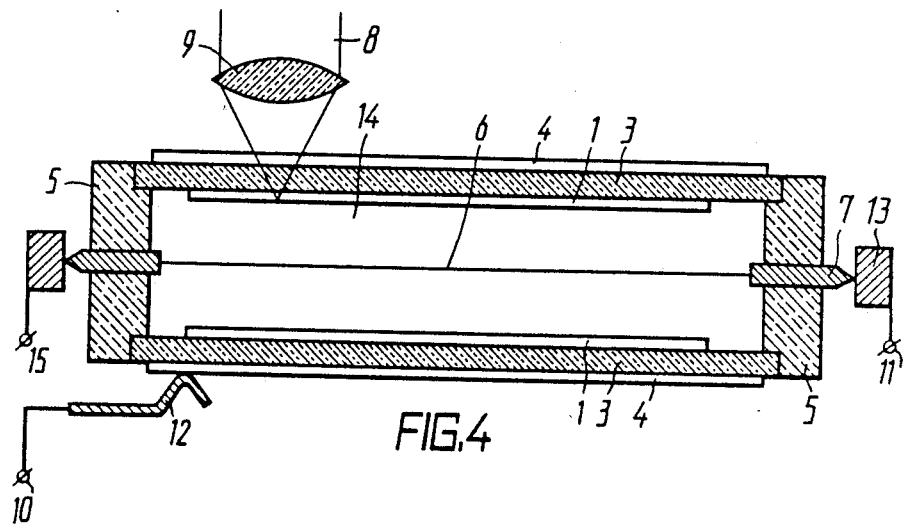

METHOD OF PHOTOTHERMAL INFORMATION RECORDING READING AND ERASING

TECHNICAL FIELD

This invention relates to the field of information recording, reading and erasing, which are based on relative movement of an information carrier and a source of electromagnetic radiation, and, in particular, in concerned with methods of photothermal recording, reading and erasing of information.

BACKGROUND ART

The present invention deals with one of the vital problems of photothermal recording and storage of digital information, which is effected by means of optical storage devices capable of erasing information and recording it again. The existing methods of reversible recording of data, which make use of reversible magnetooptical and structural transformations in the recording media based on chalcogenide resins are extremely difficult to realize.

Known in the art is a method of photothermal information recording, reading and erasing, based on hydrodynamic effect in heated thin films of liquid (A. L. Kartuzhansky, Neserebrianye Protsessy Tonkikh Plenok Zhidkosti, 1984, Khimiya Publ., Leningrad, pp. 231-232), which consists in that changes in the geometry of the thinfilm surface, corresponding to information being recorded and dictated by the temperature relations of the surface energy in this film, are obtained by irradiating the film which absorbs this radiation.

This prior art method is deficient in that the storage period is too short and the sensitivity and resolution are too low, which is inherent in the liquid film characterized by thermal quasi-equlibrium of hydrodynamic relaxation.

Also known in the art is a method of photothermal information recording, reading and erasing (A.L. Kartuzhansky, Neserebrianye Fotograficheskie Protsessy, 1984, Khimiya Publ., Leningrad, pp. 44-49), comprising the steps of producing a potential pattern in the recording medium film by preliminary uniform charging of this film surface by a corona discharge, projecting an image to be recorded onto the film in the spectral range corresponding to the photoconductivity of the film material, developing the latent pattern by simultaneously softening the entire film by heating, and fixing the pattern, e.g. by cooling the film surface. The pattern recorded by this method is erased by heating and softening the recording medium.

The prior art method of photothermal information recording, reading and erasing can be used for multiple information rewriting. It is highly sensitive and offers a long period of storage. But this method is deficient in that the level of noise is too high because of the inherent deformations of photoplastic materials. Moreover, duration of one recording-erasing cycle is too long due to the contributing factors, such as the time required for charging the surface of the film, low mobility of current carriers in the photoplastic material, and the period of thermal relaxation of the recording medium. The resolution of the method is not high enough for the information recording and reading to be performed with a density provided by optical systems. In addition, the transmission band is too narrow. These deficiencies are inherent in the techniques of producing a latent pattern and developing this pattern over the entire surface of the thin film. To realize this prior art method, it is necessary, at first, to delineate a latent pattern which is a varying density of the surface charge throughout the film surface. Such variations in the surface charge density are dictated by the brightness of the pattern projected onto the film surface. This imaging technique is time-consuming and is the one of the sources of noises. The latent pattern is developed by simultaneous softening of the entire film and this brings out, as a surface relief pattern, not only the latent image but also interferences. In addition, heating and subsequent cooling of the entire recording medium requires too much time. To summarize, this prior art method cannot provide optimal conditions for film deformation during photothermal recording and erasing of an information unit. It cannot provide photothermal recording and erasing of information so that the information unit is localized to a size limit ensured by the resolution of optical systems.

The closest prior art is a method for photothermal information recording, reading and erasing Vtoraya vsesojuznaya nauchno-tekhnicheskaya konferentsiya "Problemy razvitiya Radiotekhniki", 1985, Tsentralnoye i gruzinskoye respublikanskoye pravleniye nauchno-tekhnicheskogo obschestva radiotekhniki elektroniki i svyazi imeni A. S. Popova, Moscow, pp. 62-63), in which information is recorded by exposing a recording medium on a substrate, which is capable of spreading over this substrate when melted, to a modulated electromagnetic beam localized to a spot size of the order of one information unit, using this electromagnetic beam to melt and change the pattern of the recording medium, and then fixing thus obtained localized information units in the form of two-level pits by cooling the recording medium. This is the end of the photothermal process of information recording. Readout of pits is performed by a focused electromagnetic beam. Recorded information can be erased by heating the entire surface of the recording medium.

This prior art method offers the advantage of discrete photothermal information recording and erasing within short periods of time dictated by the duration of electromagnetic pulses with the density offered by optical systems and a high signal-to-noise ratio. But this method is deficient in that the reliability of information processing is not high and the number of rewrite cycles is low. The reason is that the recording medium has to satisfy several conflicting requirements involved in the processes of information recording and erasing. In fact, since the surface relief pattern of the recording medium is changed due to the gradient of forces of the surface tension and hydrodynamic stress, it should be heated to a temperature substantially exceeding its melting point in order to improve the viscoelastic properties of the recording medium and raise the probability of pit centers to appear. But this temperature results in fast destruction of the material of the recording medium and drastically reduces the number of rewrite cycles which could be realized. High-power continuous lasers are to be used to heat the recording medium for recording and this results in a considerable increase in weight and dimensions of devices for photothermal recording, reading and erasing of information. It seems that the remedy is to use thin-film recording media in order to bring down the required beam power. Such thin films possess low surface energy since they are made of materials which do not wet the substrate when liquid. But this runs contrary to the requirements set to such films by conditions for erasing information whereby the recording medium is to be stable to external exposure for reliable information storage.

The prior art method makes use of a recording medium whose surface energy cannot be controlled during information recording, reading and erasing. Requirements set to the surface energy the recording medium must posses during recording and erasing are conflicting. To optimize conditions for information recording, reading and erasing, it is necessary to reduce the surface energy of the recording medium film during recording and to increase this energy during erasing of information.

The prior art method offers no way to control the surface energy of the recording medium film during information recording, reading and erasing in order to provide optimal conditions for these processes.

DISCLOSURE OF THE INVENTION

The invention is to provide a method of photothermal recording, reading, and erasing of information, which can change the surface energy of the recording medium in order to change the force of the electromagnetic beam acting on the recording medium and to prevent destruction of the material of this recording medium, and as a result, to provide optimal conditions for deformation of the recording medium during the process of photothermal recording, reading, and erasing of information, in order to substantially increase the number of rewrite cycles and to make optical devices for photothermal recording, reading, and erasing lighter in weight and smaller in size.

The essence of the invention resides in that in a method for photothermal information recording, reading and erasing, consisting in that, in order to produce each information unit from a sequence of information units having a two-level deep pattern in a recording medium disposed on a substrate in the process of photothermal recording of information and for reading and erasing of information, this recording medium is exposed to a modulated electromagnetic beam localized to a size of the order of one information unit-pit, the recording medium being made of a material capable to spread over the substrate when softened, and according to the invention, a charge is applied onto the surface of the recording medium prior to the photothermal information recording, the modulated electromagnetic beam localized to a size of the order of one information unit is applied to the recording medium for photothermal recording of information with the energy exceeding the energy required for softening the material of the recording medium but less than the energy sufficient for destruction of the material of the recording medium, and, for information reading, with the energy less than the energy for softening the material of the recording medium, and the surface of the recording medium is charged prior to erasing information therefrom.

The term "softening energy" resorted to in the description as applied to the recording medium means the energy which is required to soften the material of the recording medium. The term "destruction energy" of the material of the recording medium means the energy to which the material of the recording medium has to be exposed to for its destruction.

The advantages of the invention are: controlled parameters of the recording medium during photothermal recording, reading and erasing of information, and high reliability of storage devices which could be made small and light.

BRIEF DESCRIPTION OF ACCOMPANYING DRAWINGS

The invention will now be described in greater detail with reference to specific embodiments thereof and accompanying drawings wherein:

FIG. 3 illustrates a cross-sectional view of an embodiment of an optical device for photothermal recording, reading and erasing of information, featuring a filament for sustaining a corona discharge, according to the invention;

FIG. 4 illustrates a cross-sectional view of an embodiment of an optical device for photothermal recording, reading and erasing of information, featuring an electron emitter, according to the invention.

BEST MODE FOR CARRYING OUT THE INVENTION

In accordance with the herein disclosed method for photothermal information recording, reading and erasing, a charge is applied on the surface of a recording medium prior to photothermal recording of information. The material of the recording medium may be a semiconductor or a dielectric and it should be capable to spread over the substrate when soft. In order to apply a charge onto the surface of the recording medium, several methods can be used, such as thermoelectronic emission and a corona discharge. The surface energy of the recording medium depends on the material of the recording medium, the material of the substrate, and the method of coating employed to apply this recording medium on the substrate. The surface energy of the charged recording medium is the sum of the surface energy of the non-charged recording medium and the energy of interaction of applied charges.

Since interaction energy of like charges is negative, the energy of the charged recording medium is less than the energy of a non-charged recording medium. This means that the surface charge of the recording medium results, through the action of applied charges, in a reduction of the surface energy of the recording medium which can even become negative. However, irregularities of the recording medium tend to develop into a two-level deep surface relief pattern (that is a pit is either available or not but the depth of all pits on the average is uniform) only in the area where the recording medium is to be melted, e.g. by laser emission.

Each information unit, from a sequence of information units, having a two-level deep pattern in the recording medium disposed on a substrate is produced by exposing this recording medium, in the process of photothermal recording, to a modulated electromagnetic beam localized to a spot size of the order of one information unitpit. The energy of this beam should be more than the energy required to soften the material of the recording medium but less than the energy of destruction of this material. The process of photothermal recording of information may be organized in different ways. During discrete photothermal recording, the laser beam can be modulated by its intensity, the cross-sectional area, and the beam trajectory.

Figure 1:
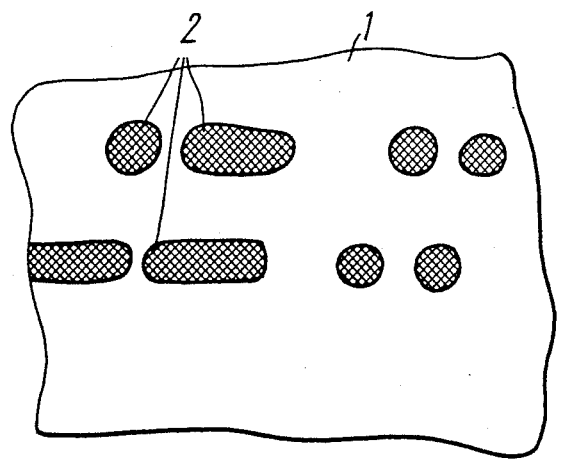
FIG. 1 illustrates a fragment of a recording medium with a descrete recording made as a two-level deep pattern, according to the invention.

Referring to FIG. 1, a fragment of a recording medium 1 has a discrete recording made as a two-level surface relief pattern made up of pits 2.

During continuous photothermal recording, the laser beam can be modulated by its width.

Figure 2:
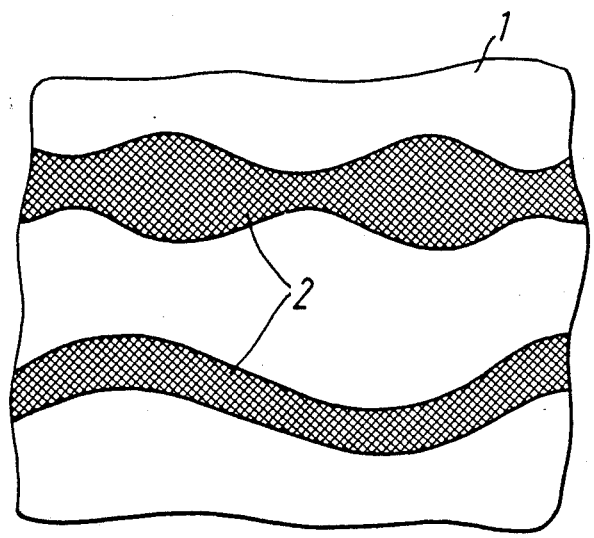
FIG. 2 illustrates a fragment of a recording medium with a continuous recording made as a two-level deep pattern, according to the invention.

Referring to FIG. 2, a fragment of the recording medium 1 has a continuous recording made as a two-level surface relief pattern made up of pits 2.

Reduction of the surface energy of the recording medium during photothermal information recording permits heating of the recording medium by an electromagnetic beam to a temperature less than the destruction temperature of the material of the recording medium. This eliminates undesirable processes in the recording medium and the number of rewrite cycles can be significantly increased. The surface energy of an uncharged recording medium may be high enough. This makes it possible to use a recording medium which adequately wets the substrate when melted and having adequate adhesion to the substrate when solid. During information storage, when the recording medium is discharged, its resistivity to erasing effects is, therefore, improved. The recording medium needs no special devices for discharge, it discharges by itsself through leakage currents in the recording medium and through the corona discharge of the opposite polarity prior to the photothermal recording in recording mediums made from dielectric materials.

during information readout, the recording medium is exposed to an electromagnetic beam localized to a size of the order of one information unit, whose energy is substantially less than the energy required to soften the material of the recording medium. The recording medium can, at this stage, be either charged or discharged. Exposure to this energy brings no changes to the characteristics of the material of the recording medium.

During information erasing, the recording medium is discharged in advance in order to achieve high wettability of the substrate by the recording medium. Then the recording medium is exposed to a modulated electromagnetic beam, e.g. laser beam, localized to a spot size of the order of one information unit with the energy exceeding the softening energy of the recording medium but less than the destruction energy of the material of this recording medium.

To summarize, charging of the surface of the recording medium ensures control of the surface energy of this recording medium. This makes it possible to control the effect of the electromagnetic beam on the recording medium and to avoid destruction of the material of this recording medium in the process of photothermal information recording, reading and erasing.

In this manner the reliability of photothermal information recording, reading and erasing can be improved and the number of information rewrite cycles appreciably increased. The device for photothermal information recording, reading and erasing can be made smaller and lighter.

An optical device for photothermal information recording, reading and erasing comprises a cylinder 3 (FIG. 3) made of a transparent material, a film of a recording medium 1 being coated on the internal surface thereof. The external surface of the cylinder 3 is coated by a transparent current-conducting film 4. A central electrode 6 is secured along the axis of the cylinder 3 on insulating covers 5. In FIG. 3 the central electrode 6 represents a pit. One or two leads 7 for the central electrode 6 are secured in the covers 6. The cylinder 3 is air-tight and may be filled with inert gas when a corona discharge is used to charge the recording medium 1. A modulated electromagnetic beam 8, e.g. a laser beam, localized to a spot size of the order of one information unit is used for photothermal information recording. The beam 8 is focused by an objective lens 9. Relative movement of the objective lens 9 and the cylinder 3 from one pit to another is effected by a positioning system (not shown). The constant-sign voltage drop required for the corona discharge is supplied to terminals 10 and 11 and, further on, via a spring contact 12, to the conducting transparent film 4 and, via a contact 13 and the lead 7, to the corona-discharge central electrode 6.

Referring to FIG. 4, an embodiment, shown therein, of a device for photothermal information recording, reading and erasing, according to the invention, differs from the embodiment of FIG. 3 in that an electron emitter is used instead of the central electrode 6. In this embodiment, the recording medium 1 can be charged by way of thermoelectronic emission. In this case, a difference of potentials is applied to the terminals 10 and 11, while the internal space 14 of the cylinder 3 is evacuated and sealed. When a high negative, in relation to terminal 10, potential is applied to a terminal 15, emitted electrons hit the surface of the recording medium 1 and, thereby, charge this medium 1. The recording medium 1 should be made of semiconductor materials so that it can be discharted after the difference of potentials is removed from the terminals 10, 11 and 15.

The optical device for photothermal information recording, reading and erasing operates as follows.

The cylinder 3 (FIG. 3) is set into rotation about its axis by a motor (not shown) and is thus transported in relation to the objective lens 9 by means of a positioning system controlling this movement.

A constant-sign difference of potentials is applied to the terminals 10 and 11 to initiate a corona discharge and charge the surface of the recording medium 1.

To perform photothermal recording of information, the positioning system transports the cylinder 3 to a desired address. The laser beam 8 localized to a spot size of the order of one information unit is directed to the recording medium 1 to form a pit. Then the positioning system transports the cylinder 3 to a new address and a new pit can be recorded by the laser beam 8.

In this manner several information units, pits, can be recorded in several areas of the recording medium 1. The energy of the laser beam 8, in this case, should be more than the softening energy of the material of the recording medium 1 but less than the destruction energy thereof. To read information, the recording medium 1 is exposed to a laser beams 8 localized to a spot size of the order of one information unit. The energy of the laser beam 8 at this stage is substantially less than during recording when a pit is produced. This energy of the laser beam 8 is less than the energy required to soften the material of the recording medium 1. The beam reflected by the recording medium 1 is recorded. The intensity of the reflected beam is modulated by the two-level deep surface relief pattern of the recording medium 1 in accordance with the recorded pits. The address of the readout information unit is determined by the positioning system.

To erase information, the surface of the recording medium 1 is discharged in advance. To this end, a constant-sign difference of potentials is applied to terminals 10 and 11, the sign being opposite to the charge polarity.

To erase information, the positioning system transports the cylinder 3 to a desired address and a modulated laser beam 8 localized to a spot size of the order of one information unit acts on the recording medium 1. The energy of such laser beam 8 is more than the softening energy of the material of the recording medium 1 but less than the destruction energy thereof.

Below is an example of realization of recording and erasing processes.

The film of the recording medium 1 is 60 mm thick and is made of chalcogenide glass. The objective lens 9 focuses the laser beam 8 to a spot with a diameter of 1.3 micrometers. The power of laser emission ranges from 1 to 82 Mw. The thin film of the recording medium 1 was charged by a corona discharge with the difference of potentials between the terminals 10 and 11 equal to 18 kW. Maximum charging current was 8 microamperes. Charging time was 20 ms. Duration of recording light pulses was 90 ns. With the charge of the thin film of the recording medium 1 equal to $1.5 \cdot 10^{-6}$ C, the minimal laser power required for photothermal recording was 6 Mw and for the discharged film, the minimal laser power required for recording was 13 Mw. The power of the laser beam for readout was 1 Mw. The time period for self-discharge of the recording medium 1 was $2.8 \cdot 10^3$ seconds. The discharge was accelerated by a corona discharge with a difference of potentials applied to the terminals 10 and 11 equal to 18 Kw, the sign being opposite to the polarity of the film charge. Information was locally erased by heating the recording medium 1 by unfocused laser emission. The diameter of the light spot on the recording medium 1 was 3.0 micrometers. Information was erased by laser emission with a power of 39 Mw.

To sum up, the charge imparted to the surface of the recording medium 1 changes the surface energy of this recording medium, permits the use of lower power for photothermal recording, and, consequently, prevents destruction of the material of the recording medium 1. Moreover, optimal conditions are provided for patterning the recording medium 1 when using photothermal methods of information recording, reading and erasing. A photothermal information recording process on a charged recording medium 1 requires half the power as contrasted to conventional methods. The energy of the laser beam 8 during recording on the medium 1 amounts to $4.10^{-10}$ J/$\mu$m$^2$, which is more than required for softening the material of the recording medium 1 since the softening energy is equal to $3.2.10^{-10}$ J/$\mu$m$^2$, but less than the destruction energy of the material of this recording medium, which is equal to $6.7.10^{-10}$ J/$\mu$m$^2$. The energy of the laser beam 8 during recording on an uncharged film amounts to $8.7 \cdot 10^{-10}$ J/$\mu$m$^2$ which is in excess of the destruction energy of the material of the recording medium 1. It can be concluded that charging the recording medium 1 permits recording of an information pit in optimal conditions without any destruction of the recording medium 1, which is important since it makes recording more reliable and permits multiple recordings after erasing information from the thin film.

Information is read by exposing the recording medium 1 to laser emission with the energy of $0.9.10^{-10}$ J/$\mu$m$^2$, which is substantially less than the energy required for softening the material of the recording medium 1.

Information is erased by a laser beam with the energy equal to $5.10^{-10}$ J/$\mu$m$^2$, which is in excess of the energy required to soften the material of the recording medium 1 and less than the destruction energy thereof.

In this manner the reliability of photothermal processes of information recording, reading and erasing is substantially improved, multiple rewriting of information becomes possible, the weight and size of devices for photothermal recording, reading and erasing of information are appreciably reduced.

INDUSTRIAL APPLICABILITY

This invention can be employed in computers, in video and sound recording systems, in information storage and processing systems.

We claim:

1. A method for photothermal information recording, reading, and erasing, which consists in that, in order to produce each information unit from a sequence of information units having a two-level deep surface relief pattern in a recording medium (1) disposed on a substrate, in the process of photothermal information recording, and for reading and erasing of information, this recording medium (1) is exposed to a modulated electromagnetic beam (8) localized to a spot size of the order of one information unit-pit, said recording medium (1) being made of a material capable of spreading when soft over the substrate, characterized in that, prior to photothermal information recording, the surface of the recording medium (1) is charged, the electromagnetic beam (8) acting on the recording medium (1) and localized to a spot size of the order of one information unit for photothermal information recording and erasing has more energy that is required for softening the material of the recording medium (1) but less than to destroy the material of this recording medium (1), and for reading the energy of the beam (8) is less than the softening energy of the material of the recording medium (1), the surface of the recording medium (1) being discharged prior to erasing of information.

* * * * *